H. BLUNDELL.
SCREW DIE-PRESS.

No. 170,984. Patented Dec. 14, 1875.

WITNESSES.
George H. Mellor.
L. P. Langworthy.

INVENTOR.
Henry Blundell
by Joseph A. Miller
Attorney

UNITED STATES PATENT OFFICE

HENRY BLUNDELL, OF PROVIDENCE, RHODE ISLAND.

IMPROVEMENT IN SCREW DIE-PRESSES.

Specification forming part of Letters Patent No. 170,984, dated December 14, 1875; application filed November 6, 1875.

*To all whom it may concern:*

Be it known that I, HENRY BLUNDELL, of Providence, county of Providence and State of Rhode Island, have invented certain new and useful Improvements in Screw Die-Presses; and I hereby declare that the following is a full, clear, and exact description of the same, which will enable others skilled in the art to make and use the same, reference being had to the accompanying drawings, forming part of this specification.

The object of this invention is to provide screw die-presses, such as are used by jewelers for stamping and embossing jewelry, with an adjustable stop, so that the die shall pass only to a certain point into the reverse part of the same, and shall be stopped at the desired point; and consists in cutting or chasing a left-handed thread of a fine pitch on the ordinary screw-thread of the screw-spindle, so that a stop may be secured to screw die-presses, in which the screw-spindle is provided with the usual screw-thread, and thus applied to all presses having the usual screw-spindle.

Figure 1:
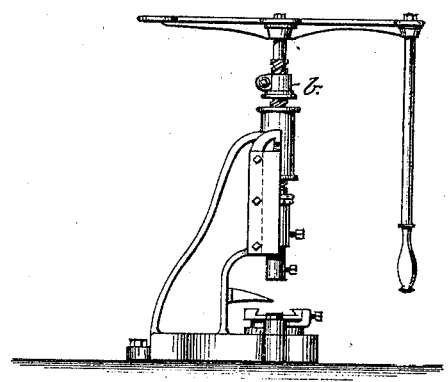
Figure 2:
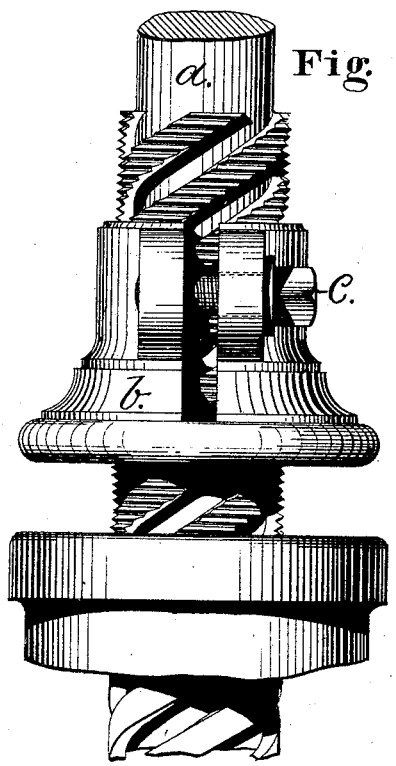
Figure 3:
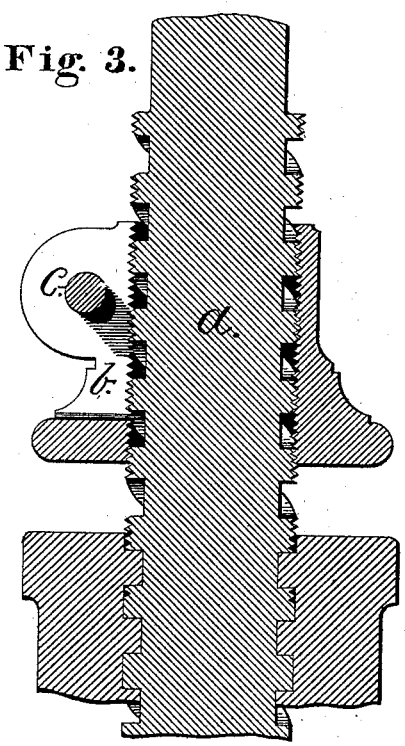

Figure 1 is an elevation of a jeweler's screw die-press of the usual construction, provided with an adjustable stop. Fig. 2 is an enlarged view of the screw-spindle and the adjustable stop, showing the finer left-handed thread cut on the projecting thread of the screw-spindle. Fig. 3 is a vertical section of the screw-spindle and stop.

Similar letters of reference indicate corresponding parts.

In the drawings, $a$ is the screw-spindle of a jeweler's die-press, provided with the usual right-handed screw-thread. $b$ is the adjustable stop, consisting of a nut fitting to a left-handed fine screw-thread cut on the thread of the usual right-handed screw on the spindle $a$. The stop or nut $b$ is split part of its length, and provided with the screw C, by which the same may be firmly secured to the screw-spindle.

The advantages of a reliable and easily-adjustable stop to the spindle of a jeweler's die-press are so great that it becomes desirable to provide screw die-presses already constructed with the same. As the screw-spindle is the most costly part of the press it is desirable to utilize the same. This cannot be done when the screw-thread on the upper end of the spindle has to be first removed and a new thread cut on the spindle, as the spindle is thereby so much reduced that it will not resist the torsional strain of the lever.

By my invention the spindle is not reduced in strength, and a reliable and adjustable stop can be secured to old die-presses at small cost by cutting a fine left-handed screw-thread on the upper part of the spindle.

I am aware that left-handed screws, as also finer-threaded screws, have been cut on the upper end of a screw die-press spindle; but in these cases the spindle had to be specially constructed for this purpose, and the arrangement was not applicable to spindles made in the usual manner. The screw-spindle in these cases must also be sufficiently longer to allow for the upper thread, as this part cannot enter the main nut.

I do not broadly claim the invention of the stop and fine-threaded left-handed screw above the usual screw-thread on the spindle, such being to me well known; but, Having fully described my invention, I claim as new and desire to secure by Letters Patent as my invention—

The combination of the spindle $a$, provided with a right-handed screw of the usual pitch, and a left-handed screw of less pitch cut on the thread of the same at its upper part, with the stop $b$ and clamp-screw $c$, arranged and operating substantially as and for the purpose described.

HENRY BLUNDELL.

Witnesses:
JOSEPH A. MILLER,
HORACE F. HORTON.